UNITED STATES PATENT OFFICE.

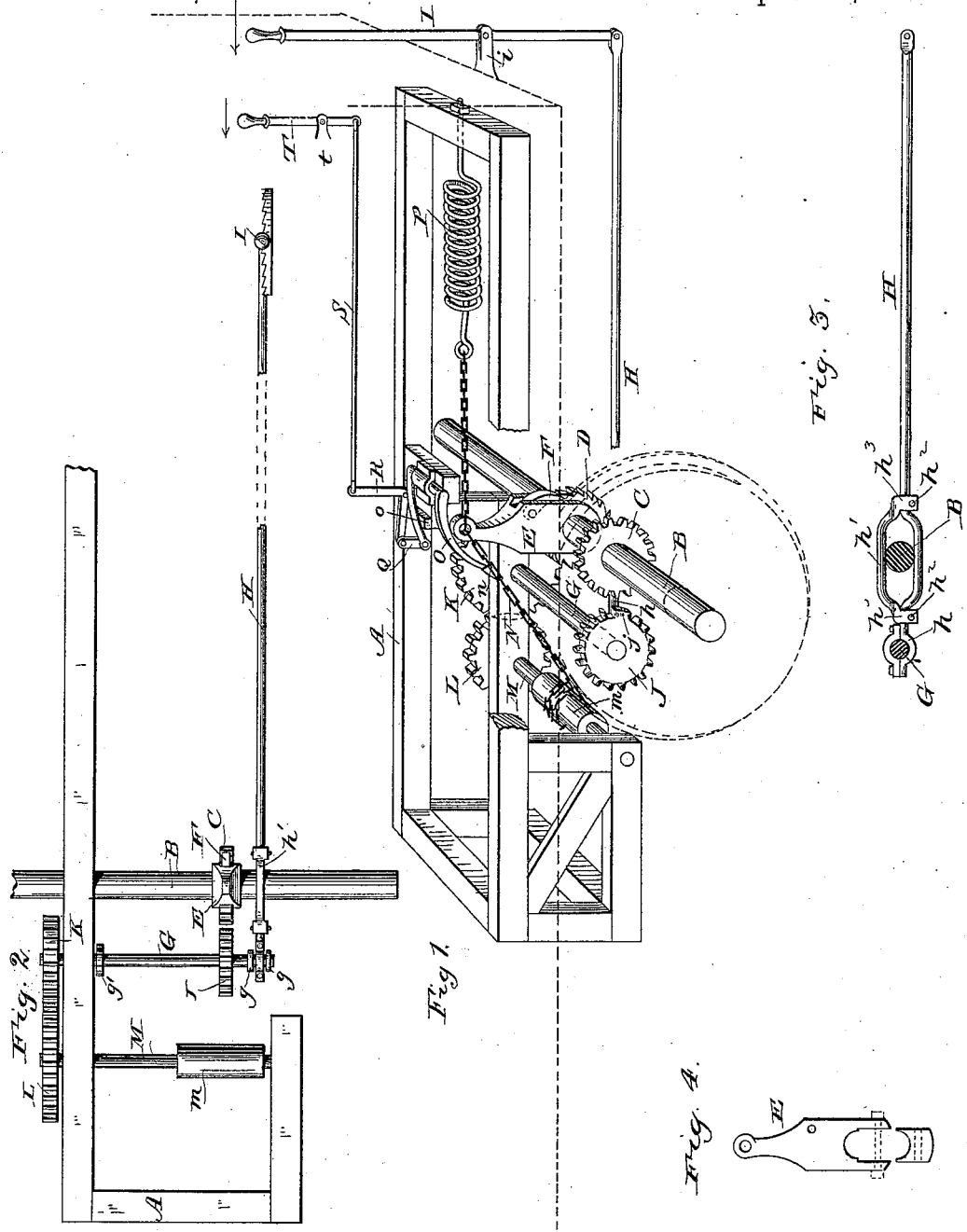

JACOB W. STRICKLE AND GEORGE R. STRICKLE, OF LOUISVILLE, KY.

CAR STARTER AND BRAKE.

SPECIFICATION forming part of Letters Patent No. 297,309, dated April 22, 1884.

Application filed March 7, 1884. (No model.)

*To all whom it may concern:*

Be it known that we, JACOB W. STRICKLE and GEORGE R. STRICKLE, citizens of the United States, residing at Louisville, in the county of Jefferson and State of Kentucky, have invented certain new and useful Improvements in Car-Starters, of which the following is a specification, reference being had therein to the accompanying drawings.

Our invention relates to that class of car-starters in which the momentum of the moving vehicle is utilized to extend a strong spring, the force of which may be applied to one of the axles of the car when it is desired to start the latter again, and, as the force required to extend the spring is exerted on the axle of the car as a drag in stopping, our device serves the double purpose of a brake and starter.

In the drawings, Figure 1 is a perspective view of our invention applied to the front axle of a car, the body of the latter being indicated in dotted lines. Fig. 2 is a plan view of our invention in a slightly-modified form, a portion of the mechanism being omitted for greater clearness; and Figs. 3 and 4 are detail views.

A is a strong wooden frame, which is to be securely fastened to the bottom of the car in any suitable manner. B is one of the axles of the car, to which are secured a gear-wheel, C, and a ratchet-wheel, D.

Pivoted loosely on the axle B is a forked lever or pawl-carrier, E, having a pawl, F, arranged to engage the teeth of the ratchet-wheel when the pawl-carrier is moved forward, but to ride freely over said teeth when said pawl-carrier is moved backward. For convenience in applying the lever or pawl-carrier E to the axle of the car, said pawl-carrier is preferably made in two parts, as shown in the detail view Fig. 4.

G is a shaft loosely journaled at one end in the frame A, and supported at its other end by an extension, $h$, of a sliding bar, H, which embraces and is sustained at one end by the axle B, its other end being jointed to a hand-lever, I, pivoted to a bracket, $i$, secured to some part of the forward end of the car. On the shaft G, on each side of the extension $h$ of the bar H, are collars, $g$ $g$, to prevent said bar from moving lengthwise of said shaft, and the latter is held from endwise movement by a collar, $g'$, or in any other suitable manner. The shaft G carries two gear-wheels, J and K, the former having a blank or double cog, $j$, and the latter gearing with a wheel, L, carried by a shaft, M, journaled in the frame A, and preferably provided with an enlarged portion or drum, $m$. The teeth of the wheel J are preferably rounded, as shown in Fig. 1, to prevent binding. To preserve the strength of the bar H it is bent, as shown in Fig. 3, and a yoke, $h'$, which rides or slides on the axle to sustain the bar, is fastened to the latter by pins or bolts, $h^2$, passing through the forked ends $h^3$ of the yoke, below the bends in the bar.

N is a chain fastened at one end to the drum $m$, so as to be wound thereon, and connected at its other end to the lever or pawl-carrier E. Said chain is provided with an inclined stop or catch, $n$, formed with a blunt side to engage a gravitating pawl, O, pivoted to the frame A, said pawl being supported by any suitable stop, $o$, secured to the frame A or the body of the car.

P is a strong spring fastened to the frame A and connected with the lever or pawl-carrier E. Instead of the spiral spring shown, an elliptical or other form of spring may be used.

The pawl O is connected by a link, Q, with an angular or bell-crank lever, R, connected by a link, S, with a hand-lever, T, pivoted to a bracket, $t$, fastened to any convenient part of the car.

The operation of our invention is as follows: When it is desired to stop the car, the lever I is moved in the direction indicated by the arrows by the driver, to cause the gear-wheel J to engage with the gear-wheel C, the loose bearing of the shaft G in the frame A permitting a limited movement of said shaft to shift the wheel J toward or from the wheel C. The latter wheel, being secured to the moving axle B, will set the shafts G and M in motion by means of the gearing shown, causing the chain N to be wound on the drum $m$, thus moving the free end of the pawl-carrier E toward said drum and extending the spring P. The force of the latter will be communicated through the chain, shafts, and gearing to the axle of the car, acting as a brake thereon. The wheels C and J will be held in engagement by the driver during about three-fourths of a revolution of the latter, or until the double or blank cog j comes in contact with the wheel C, when said cog, by being forced against said wheel, will disengage the wheel J from the said wheel C; but just before this occurs the stop or catch n will have passed the lower end of the pawl O, so that said pawl will engage said catch and hold the spring P extended. When the car is to be started, the lever T will be moved, as indicated by the arrow adjacent thereto in the drawings, thus raising the pawl O from the stop n and allowing the force of the extended spring to be exerted on the pawl-carrier E and through the pawl F and ratchet-wheel D on the axle of the car, thus assisting in starting the vehicle.

In the modified form of our invention, of which Fig. 2 is a plan view, the blank or double cog j of the wheel J will be omitted by making said wheel with a full circle of teeth all alike. The stop or catch n will be omitted from the chain N, and the pawl O and hand-lever T and intermediate connections will also be left out. The other parts of this form of our invention will be the same as shown in Fig. 1, excepting that the proportions of the gear-wheels K and L will preferably be reversed. In using this modification the hand-lever I, when moved in the direction indicated by the arrow in Fig. 1, will be held in the proper position to keep the wheels C and J in gear by a ratchet-bar, against which the lever will be forced by its own resiliency or by a suitable spring. Thus the stress of the spring P will be exerted on the axle of the car to stop the same, in the manner hereinbefore described, as long as the car continues to move; but if the car has so much momentum that there will be danger of breaking the spring, the ordinary brakes can be applied to the wheels by the driver in the usual way. When the car is to be started, the hand-lever I will be loosened and returned to its unlocked position, and the extended spring P will then be free to exert its full force on the axle of the car, to assist in starting the vehicle.

It will be understood that our invention may be applied to both ends of a car, so as to be operated by the driver when on either platform, if desired.

Having thus described our invention, we claim and desire to secure by Letters Patent—

1. The combination, with the axle of a car, of a ratchet-wheel secured thereto, a lever or pawl carrier mounted loosely on said axle and provided with a pawl, a spring connected with said pawl-carrier, a gear-wheel mounted on said axle, a second gear-wheel adapted to be moved toward or from the first gear-wheel, mechanism arranged to be operated by the driver of the car for bringing said gear-wheels into engagement with each other when the car is to be stopped, and mechanism operated by said gear-wheels and connected with said pawl-carrier for extending said spring, all substantially as set forth.

2. The combination, with the axle of a car, of a ratchet-wheel secured thereto, a pawl-carrier having a pawl, a spring connected with said pawl-carrier, mechanism adapted to be thrown into operation by the driver and connected with said axle for extending said spring, means for automatically disconnecting the extending mechanism from the car-axle, and means for keeping said spring extended when the extending mechanism has been thus disconnected, all substantially as set forth.

3. The combination of the axle B, ratchet-wheel D, pawl-carrier E, pawl F, gear-wheels C and J, shaft G, gear-wheels K and L, shaft M, chain N, spring P, sliding bar H, having an extension, h, serving as a support for the shaft G, and hand-lever I, substantially as set forth.

4. The combination, with the chain N, having a catch or stop, n, of the pawl O, link Q, angular lever R, link S, and hand-lever T, substantially as set forth.

5. The combination of the frame A, axle B, ratchet-wheel D, pawl-carrier E, pawl F, gear-wheels C and J, the latter having the blank or double cog j, shaft G, gear-wheels K and L, shaft M, having drum m, chain N, having stop or catch n, pawl O, links Q and S, levers R and T, spring P, sliding bar H, having extension h, and hand-lever I, substantially as set forth.

In testimony whereof we affix our signatures in presence of two witnesses.

JACOB W. STRICKLE.
GEORGE R. STRICKLE.

Witnesses to signature of Jacob W. Strickle:
C. A. ROBINSON,
THOMAS C. BARCLAY.

Witnesses to signature of Geo. R. Strickle:
W. H. BREWER,
M. A. WALKER.